United States Patent
Noda (10) Patent No.: US 10,623,656 B2
(45) Date of Patent: Apr. 14, 2020

(54) IMAGING DEVICE AND FLICKER DETECTION METHOD

(71) Applicant: Olympus Corporation, Hachioji-shi, Tokyo (JP)

(72) Inventor: Masatoshi Noda, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/432,867

(22) Filed: Jun. 5, 2019

(65) Prior Publication Data

US 2019/0289191 A1    Sep. 19, 2019

Related U.S. Application Data

(63) Continuation of application No. PCT/JP2017/041558, filed on Nov. 17, 2017.

(30) Foreign Application Priority Data

Dec. 28, 2016 (JP) .................................. 2016-255632

(51) Int. Cl.
*H04N 5/235* (2006.01)
*H04N 5/232* (2006.01)

(52) U.S. Cl.
CPC ........... *H04N 5/2357* (2013.01); *H04N 5/232* (2013.01); *H04N 5/235* (2013.01); *H04N 5/2351* (2013.01); *H04N 5/2353* (2013.01)

(58) Field of Classification Search
CPC ... H04N 5/2357; H04N 5/2351; H04N 5/2353
See application file for complete search history.

(56) References Cited

U.S. PATENT DOCUMENTS

| 10,122,937 | B2* | 11/2018 | Yu | ........................ | H04N 5/2357 |
| 2015/0163392 | A1* | 6/2015 | Malone | ................ | H04N 5/2357 |
| | | | | | 348/228.1 |
| 2017/0353660 | A1* | 12/2017 | Osawa | ................. | H04N 5/2351 |
| 2017/0366731 | A1* | 12/2017 | Onodera | ................ | H04N 5/357 |

FOREIGN PATENT DOCUMENTS

JP    2013-089991    5/2013

* cited by examiner

*Primary Examiner* — Timothy J Henn
(74) *Attorney, Agent, or Firm* — John C. Pokotylo; Pokotylo Patent Services (57) ABSTRACT

An imaging device, comprising: an image sensor that forms a subject image by means of an optical system, and a processor that comprises a flicker streak detection section and a determination section, wherein the flicker streak detection section divides an imaging range of the image sensor into a plurality of regions, performs photometry of the regions that have been divided based on an pixel signal output by the image sensor, and detects divided regions in which it is expected that flicker streaks exist, and the determination section determines whether or not it was possible to detect flicker streaks using the flicker streak detection section, wherein the flicker streak detection section, in a case where it has been determined by the determination section that it was not possible to detect flicker streaks, reduces area of the divided regions and detects divided regions in which it is expected that flicker streaks will exist.

19 Claims, 6 Drawing Sheets

IMAGING DEVICE AND FLICKER DETECTION METHOD

CROSS-REFERENCE TO RELATED APPLICATIONS

This application is a Continuation Application of PCT Application No. PCT/JP2017/041558, filed on Nov. 17, 2017, and based upon and claiming the benefit of priority from prior Japanese Patent Application No. 2016-255632, filed on Dec. 28, 2016, the entire contents of all of which are incorporated herein by reference.

BACKGROUND OF THE INVENTION

1. Field of the Invention

The present invention relates to an imaging device, a flicker detection method and a non-transitory computer-readable storage medium that, in the event that a light source contains flicker, can determine existence of this flicker.

2. Description of the Related Art

In a case where a subject that is has been lit by illumination light that repeatedly flickers has been taken by an image sensor, there may be cases where brightness differences arise in an image acquired by the image sensor depending on exposure time. A light source of illuminating light that repeatedly flickers is called a flicker light source, and there have been various proposals regarding detection methods for whether or not a light source that illuminates a subject is a flicker light source.

For example, with the imaging device disclosed in Japanese patent laid-open No. 2013-89991 (hereafter referred to as "patent publication 1"), an interval between streaks that occur within a frame due to flicker, and movement amount of flicker that occurs between frames, is stored in advance. This imaging device acquires photometry information of photometry areas that have been divided up, and determines whether or not interval between streaks and movement amount of streaks between frames that have been calculated match conditions regarding frequency, based on this photometry information. If this determination result is a match, it is determined that those streaks are flicker caused by a commercial power supply.

Also, recently an LED light source that uses an inverter power supply has become widespread, and cameras have appeared on the market that restrict the unwanted appearance of images having high frequency flicker, such as a synchroscan function etc. This synchroscan function is a function to inhibit the appearance of flicker streaks by the user adjusting shutter speed while observing an image with a rear surface liquid crystal display or EVF electronic view finder.

The previously described synchroscan function is difficult to operate, involving the user finding fine streak patterns arising due to high frequency flicker, and the need to discover a shutter speed that is in synchronism with the flicker frequency.

SUMMARY OF THE INVENTION

The present invention provides an imaging device, flicker detection method and a non-transitory computer-readable storage medium so that a user can easily perform flicker cancellation.

An imaging device of a first aspect of the present invention comprises an image sensor that forms a subject image by means of an optical system, and a processor that comprises a flicker streak detection section and a determination section, wherein the flicker streak detection section divides an imaging range of the image sensor into a plurality of regions, performs photometry of the regions that have been divided based on an pixel signal output by the image sensor, and detects divided regions in which it is expected that flicker streaks will exist, and the determination section determines whether or not it was possible to detect flicker streaks using the flicker streak detection section, wherein the flicker streak detection section, in a case where it has been determined by the determination section that it was not possible to detect flicker streaks, reduces area of the divided regions and detects divided regions in which it is expected that flicker streaks will exist.

A flicker detection method of a second aspect of the present invention is a flicker detection method for an imaging device comprising an image sensor that forms a subject image by means of an optical system, the flicker detection method comprising dividing an imaging range of the image sensor into a plurality of regions, performing photometry of the regions that have been divided based on a pixel signal output by the image sensor, and detecting divided regions in which it is expected that flicker streaks will exist, determining whether or not it was possible to detect the flicker streaks, and if it was not possible to detect the flicker streaks, reducing area of the divided regions and detecting divided regions in which it is expected that flicker streaks will appear.

A non-transitory computer-readable medium of a third aspect of the present invention, storing a processor executable code, which when executed by at least one processor, performs a flicker detecting method, the processor being arranged within an imaging device that comprises an image sensor that forms a subject image by means of an optical system, the flicker detecting method comprising dividing an imaging range of the image sensor in to a plurality of regions, performing photometry of the regions that have been divided based on an pixel signal output by the image sensor, and detecting divided regions in which it is expected that flicker streaks exist, determining whether or not it was possible to detect the flicker streaks, and if it was not possible to detect the flicker streaks, reducing area of the divided regions and detecting divided regions in which it is expected that flicker streaks will appear.

DETAILED DESCRIPTION OF THE PREFERRED EMBODIMENTS

An example where a digital camera has been adopted as one embodiment of the present invention will be described in the following. This camera has an imaging section, with a subject image being converted to image data by this imaging section, and the subject image being subjected to live view display on a display section based on this converted image data. A photographer determines composition and shooting timing while observing the live view display. It is possible to perform still picture shooting by operating the release button. Image data that has been stored in the storage medium can be subjected to playback display on the display section if playback mode is selected.

Figure 3A:
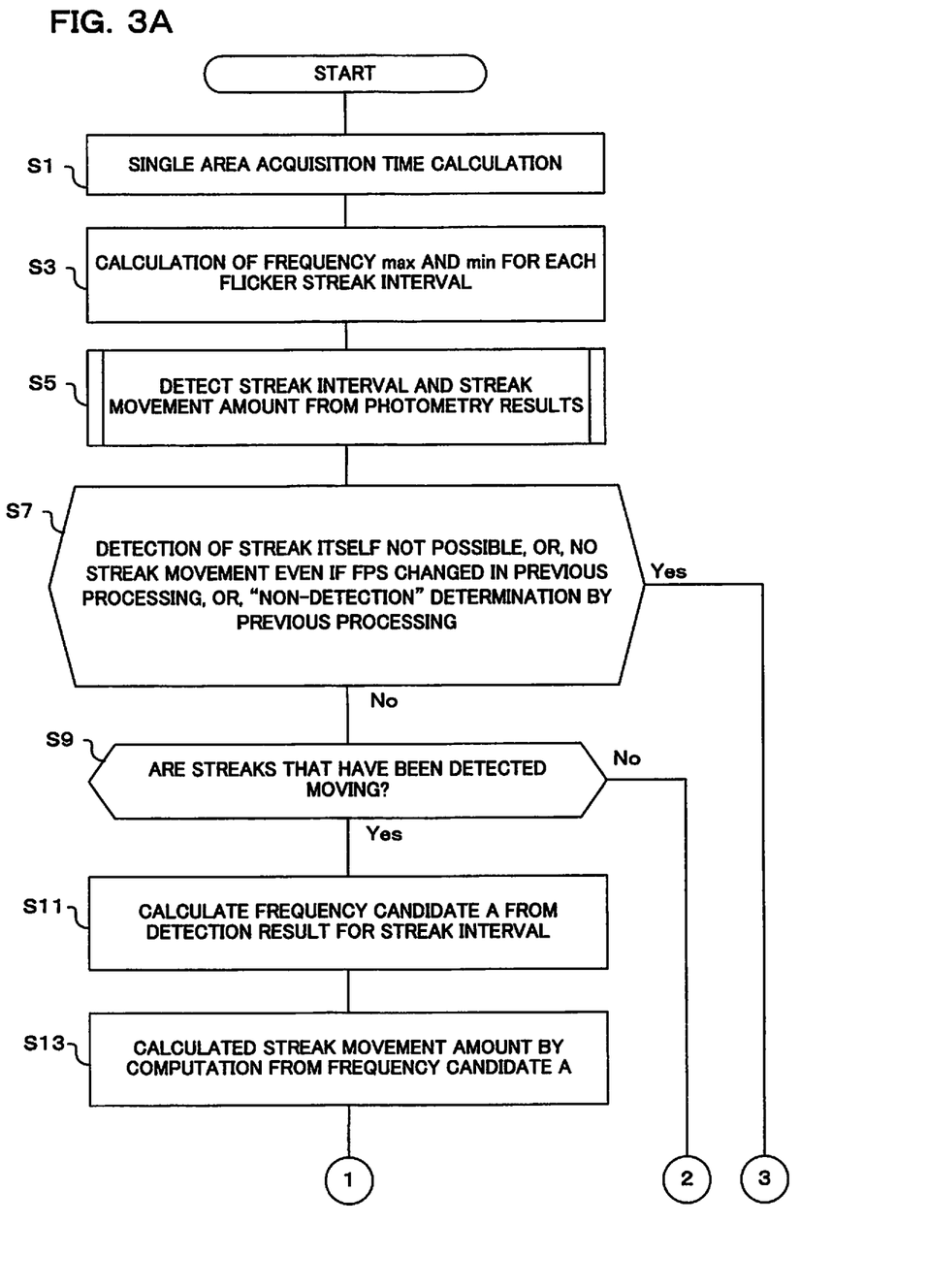
FIG. 3A and FIG. 3B are flowcharts showing operation for flicker detection of a camera of one embodiment of the present invention.
Figure 3B:
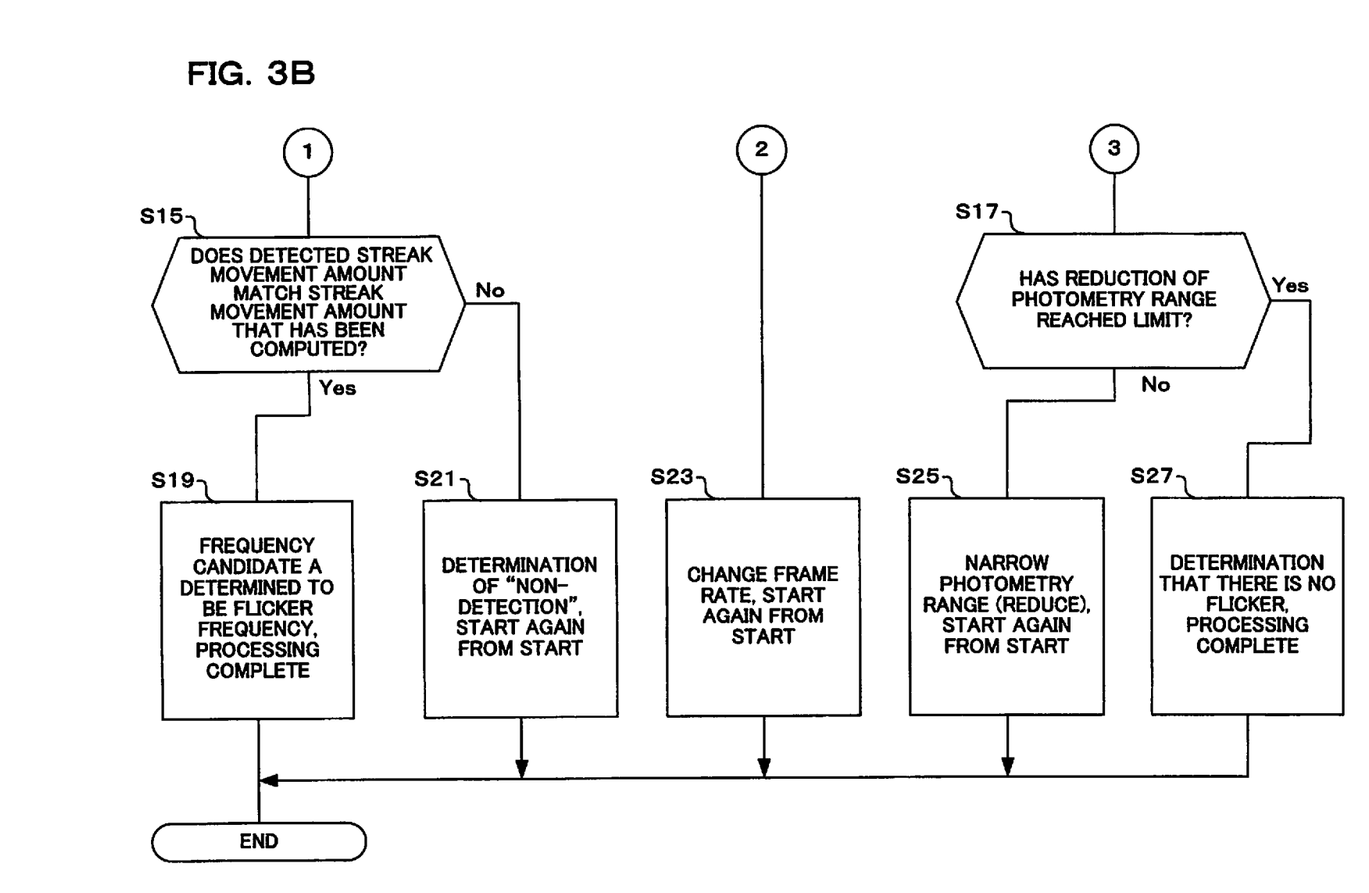

Also, the camera of this embodiment, when detecting flicker, obtains flicker frequency by detecting flicker streaks and flicker streak movement based on pixel data within a photometry range (refer, for example, FIG. 3A, and S5, S11 to S15, and S19 in FIG. 3B). If it is not possible to obtain flicker frequency, the photometry range is narrowed, and flicker frequency is obtained using the same processing (refer, for example, to S17 and S25 in FIG. 3B).

Figure 1:
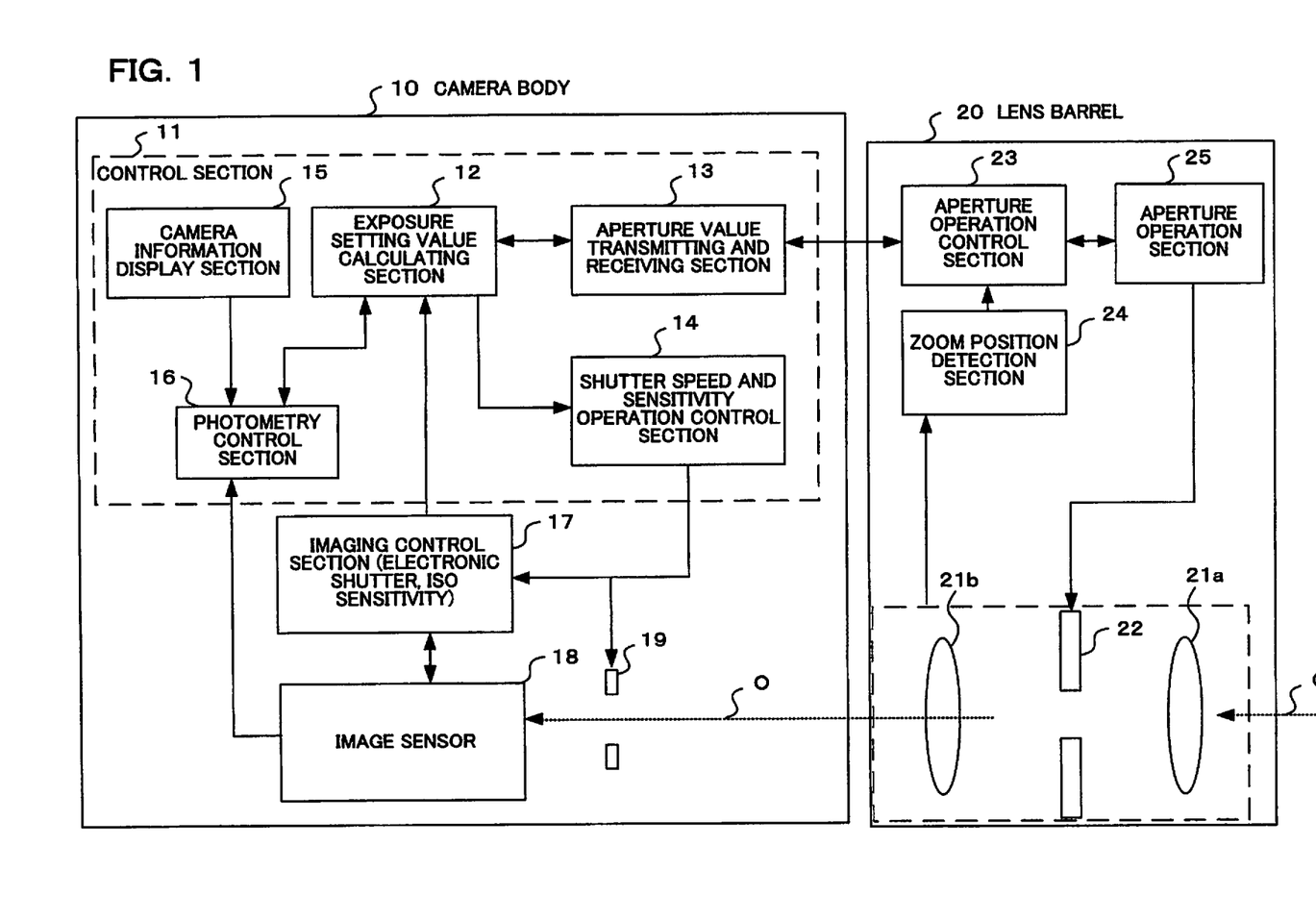
FIG. 1 is a block diagram mainly showing the electrical structure of a camera of one embodiment of the present invention.

FIG. 1 is a block diagram mainly showing the electrical structure of the camera of this embodiment. This camera has a camera body 10 and a lens barrel 20 that can be attached to the camera body 10. It should be noted that this embodiment is a so-called interchangeable lens type camera where the camera body 10 and the lens barrel 20 are formed separately. However, this is not limiting, and this embodiment may be a camera having a lens barrel formed integrally with the camera body.

A control section 11, imaging control section 17, image sensor 18 and mechanical shutter 19 are arranged within the camera body 10.

The mechanical shutter 19 is a so-called focal plane shutter or lens shutter, arranged to the front of the image sensor 18. This mechanical shutter 19 allows subject light flux from the lens barrel 20 to pass for a given exposure time (determined by shutter speed) at the time of still picture shooting. Also, at the time of movie shooting and at the time of live view display, the mechanical shutter 19 is in a wide-open state, and the imaging control section 17 controls exposure time using an electronic shutter. It should be noted that the mechanical shutter 19 is not limited to a focal plane shutter, and may be another type of shutter such as a lens shutter. In the case of a lens shutter, the shutter is arranged within the lens barrel 20. Also, the mechanical shutter 19 may be omitted, with only an electronic shutter using the image sensor 18. In this case, exposure time is limited by the electronic shutter even in the case of still picture shooting.

The image sensor 18 is a CCD (Charge Coupled Device) image sensor or CMOS (Complementary MOS) image sensor etc., and is arranged on an extended line of the optical axis O of the optical system of the lens barrel 20. The image sensor 18 has a plurality of photoelectric conversion pixels, receives light of a subject image (optical image) that has been imaged by the lens barrel 20 on an image plane, subjects this subject image to photoelectric conversion using each of the photoelectric conversion pixels, generates a pixel signal, and outputs the pixel signal to the imaging control section 17. This image sensor 18 functions as an image sensor that forms a subject image via the optical system.

The imaging control section 17 has an imaging control circuit, and performs readout control of a pixel signal from the image sensor 18 based on control signals from the control section 11. The imaging control section 17 can control exposure time (electronic shutter speed) at the plurality of photoelectric conversion pixels, by controlling the electronic shutter of the image sensor 18. The imaging control section 17 can also control ISO sensitivity by amplifying a pixel signal that has been read out from the plurality of photoelectric conversion pixels at a specified amplification factor.

The control section 11 is a controller (processor) that includes a CPU (Central Processing Unit) and peripheral circuits such as an ASIC (Application Specific Integrated Circuit), and performs control of each section within the camera body 10, and the lens barrel 20, by means of an interface circuit that is not illustrated. The CPU performs overall control of the camera in accordance with programs that have been stored in a non-volatile memory, such as flash memory. There are an exposure setting value calculation section 12, aperture value transmission and reception section 13, shutter speed and sensitivity operation control section 14, camera information display section 15, and photometry control section 16 within the control section 11. The aperture value transmission and reception section 13 includes a communication circuit as a peripheral circuit. The camera information display section 15 has a display device and a backlight device etc., and includes a display section such as a rear surface display panel. Also, each of the sections such as the exposure setting value calculation section 12 is implemented by software using a CPU etc.

The control section 11 functions as a processor that has a flicker streak detection section and a determination section. The control section 11 functions as a flicker streak detection section that divides an imaging range of the image sensor into a plurality of regions (refer, for example, to FIG. 2 and FIG. 5), and detects divided regions in which is it is expected that flicker streaks will exist by performing photometry in the divided regions based on pixel signals output by the image sensor (refer, for example, to S5 in FIG. 3A etc.). The control section 11 also functions as a determination section that determines whether or not it is possible to detect flicker streaks using the flicker streak detection section (refer, for example, to S7 in FIG. 3A etc.). Also, the above-described flicker streak detection section, in the event that it is been determined by the determination section that it is not possible to detect flicker streaks, performs detection for divided regions in which it is expected that flicker streaks will exist by reducing area of the divided regions (refer, for example, to S17 and S25 in FIG. 3B).

The control section 11 (processor) also functions as a flicker frequency calculation section that calculates frequency of flicker corresponding to flicker streaks, based on an interval, on the image sensor, between a first divided region and a second divided region in which it is expected that flicker streaks will exist, and a difference between read-out times corresponding to the first divided region and the second divided region refer, for example, to equations (2) and (3), and S3 in FIG. 3a).

The determination section described above detects flicker streaks using the flicker streak detection section, and determines whether or not it was possible to detect flicker streaks based on interval, on the image sensor, between divided regions in which flicker streaks exist (refer, for example, to S15 in FIG. 3B). The determination section also determines whether or not it was possible to detect flicker streaks based on a difference in interval, on the image sensor, between divided regions in which flicker streaks exist and frequency of flicker (refer, for example, to S15 in FIG. 3B).

Also, the above described flicker streak detection section executes imaging operations of the image sensor at a first frame rate, and detects divided regions in which it is expected that flicker streaks will exist based on pixel signals that have been acquired using different imaging operations (refer, for example, to S5 in FIG. 3A). The above described determination section determines whether or not there is change in position of the divided regions in which it is expected that flicker streaks will exist, and if it is determined that there is no change the flicker streak detection section executes imaging operations using the image sensor at a second frame rate, and detects divided regions in which it is expected that flicker streaks will exist based on pixel signals resulting from different imaging operations (refer, to S9 in FIG. 3A, S23 in FIG. 3B, etc).

Also, the above described flicker streak detection section executes imaging operations of the image sensor at a first frame rate and first electronic shutter speed, and detects divided regions in which it is expected that flicker streaks will exist based on pixel signals that have been acquired using different imaging operations (refer, for example, to S5 in FIG. 3A). The above described determination section determines whether or not there is change in position of divided regions in which it is expected that flicker streaks will exist, and if it is determined that there is no change the flicker streak detection section executes imaging operations using the image sensor at a second electronic shutter speed, and detects divided regions in which it is expected that flicker streaks will exist based on pixel signals resulting from different imaging operations (for example, in S59 to S75 in FIG. 4, detection depending on whether thickness of flicker streaks changes, by changing shutter speed (second electronic shutter speed) for flicker streaks that do not move).

The control section 11 functions as a control section (processor) that controls operation of the flicker streak detection section, and a display (display section). This control section performs imaging operations in time division using the image sensor, to acquire an image signal used by the flicker streak detection section, and an image signal used in display of the display (display section).

The camera information display section 15 includes a rear surface display panel, such as a liquid crystal display panel or organic EL, and a display control circuit, and displays images for flicker removal after output from the photometry control section 16. Also, the display panel is arranged on a rear surface of the camera body and displays various images, such as live view images, playback images, and menu images for various information settings of the camera. It should be noted that although the rear surface display panel is arranged on a rear surface of the camera body, it may also be arranged at a different position, and it is also possible to use an EVF (electrical view finder) with which it is possible to observe a small monitor through an eyepiece. The camera information display section 15 functions as a display (display section) that performs display based on imaging output of the image sensor The photometry control section 16 is input with a pixel signal from the image sensor 18 and exposure setting values that have been calculated by the exposure setting value calculation section 12, and determines whether or not there is a state where flicker will occur.

The exposure setting value calculation section 12 within the control section 11 is input with a pixel signal from the imaging control section 17, and based on this pixel signal calculates aperture value, mechanical shutter speed, electronic shutter speed, and ISO sensitivity etc. in order to achieve appropriate exposure from subject brightness. Also, in a case where a flicker determination result is input from the photometry control section 16 and flicker will arise, the exposure setting value calculation section 12 calculates electronic shutter speed and/or mechanical shutter speed so as to cancel the flicker.

An aperture value that has been calculated by the exposure setting value calculation section 12 is transmitted by means of the aperture value transmission and reception section 13 to the aperture operation control section 23 within the lens barrel 20. Also, shutter speed and sensitivity that have been calculated by the exposure setting value calculation section 12 are output to the shutter speed and sensitivity operation control section 14.

The aperture value transmission and reception section 13 has a communication circuit for transmitting and receiving between the camera body 10 and the lens barrel 20, and transmits an aperture value that has been calculated by the exposure setting value calculation section 12 at the camera body 10 side to the aperture operation control section 23 at the lens barrel 20 side. Also, in the event that the lens barrel 20 side aperture operation control section 23 has changed aperture value based on focal length (zoom encoder value) that has been detected by the zoom position detection section 24, the aperture value transmission and reception section 13 receives this changed aperture value.

The shutter speed and sensitivity operation control section 14 is input with electronic shutter speed and ISO sensitivity that have been calculated by the exposure setting value calculation section 12, and performs operation control so as to attain the input electronic shutter speed and ISO sensitivity. Also, at the time of still picture shooting, the shutter speed and sensitivity operation control section 14 performs control of the mechanical shutter 19, so as to attain a shutter speed that has been calculated by the exposure setting value calculation section 12. At the time of movie shooting or at the time of live view display, the shutter speed and sensitivity operation control section 14 is put into a state where the mechanical shutter 19 is open.

A front lens group 21a, a rear lens group 21, aperture 22, the aperture operation control section 23, a zoom position detection section 24, and aperture operation section 25, are provided within the lens barrel 20.

The front lens group 21a and the rear lens group 21b (when being described collectively, referred to as photographing lens 21 or photographing optical system) can allow a subject image to be formed on an imaging surface of the image sensor 18 by adjusting a focus lens within the photographing lens 21, and can change focal length by adjusting a zoom lens within the photographing lens 21.

The aperture 22 is arranged in the optical path of the photographing lens 21. The aperture 22 is capable of having opening diameter variably driven mechanically by the aperture operation section 25. By changing the opening diameter it is possible to change subject light amount that is incident on the image sensor 18.

The zoom position detection section 24 has a so-called zoom encoder, and detects position (specifically, focal length information) of a zoom lens within the photographing lens 21 for output to the aperture operation control section 23.

Next, an overview of the flicker determination of this embodiment will be described. Flicker determination of this embodiment is performed using the following stages (A) to (C).

(A) For a current photometry range, frequency corresponding to photometry area interval of flicker streaks is calculated from readout time for a plurality of divided photometry areas.

(B) Moving streaks are searched for based on photometry information for each photometry area, and interval and movement of flicker streaks is detected. Then, interval of streaks that have been detected are collated with a frequency range that was calculated in (A), it is determined whether or not conditions for frequency that has been collated and movement amount of streaks between frames that has been detected are met, and if conditions are met that frequency is made a flicker frequency. If the flicker streaks are not moving streaks, the frame rate is changed and the same processing is executed again. The reason for changing frame rate will be explained later.

(C) If the determination of flicker frequency in (B) above is not possible, then since there is higher speed flicker than a frequency that can be detected with the correct photometry area, the photometry range is narrowed, that range is divided into the same number of areas, and the processing of (A) and (B) described above is performed. By repeating the processing from (A) to (C), detection is performed until flicker of a high frequency.

In (B) described above changing the frame rate is for the following reason. If the flicker frequency is a numerical value that constitutes a multiple of the frame rate, flicker streaks do not move. It is difficult to distinguish that flicker streaks that do not move are a pattern of an object without any other confirmation, and so are a cause of erroneous detection. Therefore, with this embodiment, in order to confirm whether conditions for flicker frequency are met from streak interval and movement amount of streaks between frames, the frame rate is changed in a condition such that flicker streaks no longer move. It should be noted that it is also possible to perform flicker determination without changing frame rate, by switching a value for shutter speed (Tv) between frames, checking whether thickness of flicker streaks that do not move changes, and determining whether or not a streak is caused by flicker.

Flicker determination is performed by detecting interval between flicker streaks arising due to flicker, and movement of streaks. With this embodiment, a frequency range in which it is possible to determine brightness change caused by flicker in a current photometry range is calculated, as was described in (A) above. Since whether or not there are flicker streaks is determined for every divided photometry area, a flicker period that can be detected is expressed in divided photometry area units. Accordingly, a flicker frequency that can be detected using specified divided photometry areas can be detected as a frequency range that depends on a number of divisions of the photometry areas.

Flicker frequency becomes 50 Hz or 60 Hz, for example, in a case where a light source is used that exhibits fluctuation in brightness at the same frequency as the frequency of a light source that uses a commercial power supply. However, in the case of an LED light source etc., the flicker frequency may not be the same as the commercial power supply frequency, and may become a further higher frequency. In the event that the flicker frequency is a high frequency, the flicker streak interval becomes narrow, and detection becomes difficult. With this embodiment therefore, flicker is detected in a detectable frequency range, and flicker detection is performed while changing this detectable range. Also, an upper limit of the flicker frequency that can be detected is restrict by the number of pixels of the image sensor 18 corresponding to the divided photometry areas. This is because it is necessary to make a number of pixels of a single divided photometry area a specified number or more in order to ensure reliability of photometry.

Changing range for flicker frequency that can be detected, by changing photometry range, will be described using FIG. 2. In a case where a number of divisions of the multiply divided photometry areas is low compared to flicker streak interval, it is not possible to determine streaks from photometry results, even if flicker streaks have moved for each frame. In this case, fineness of areas with regard to flicker streak interval is ensured by narrowing (reducing) the photometry range and similarly performing the area division. Also, in the event that frame rate and flicker frequency are synchronized, frame rate is changed, for example, such that the flicker streaks are made to move.

Figure 2:
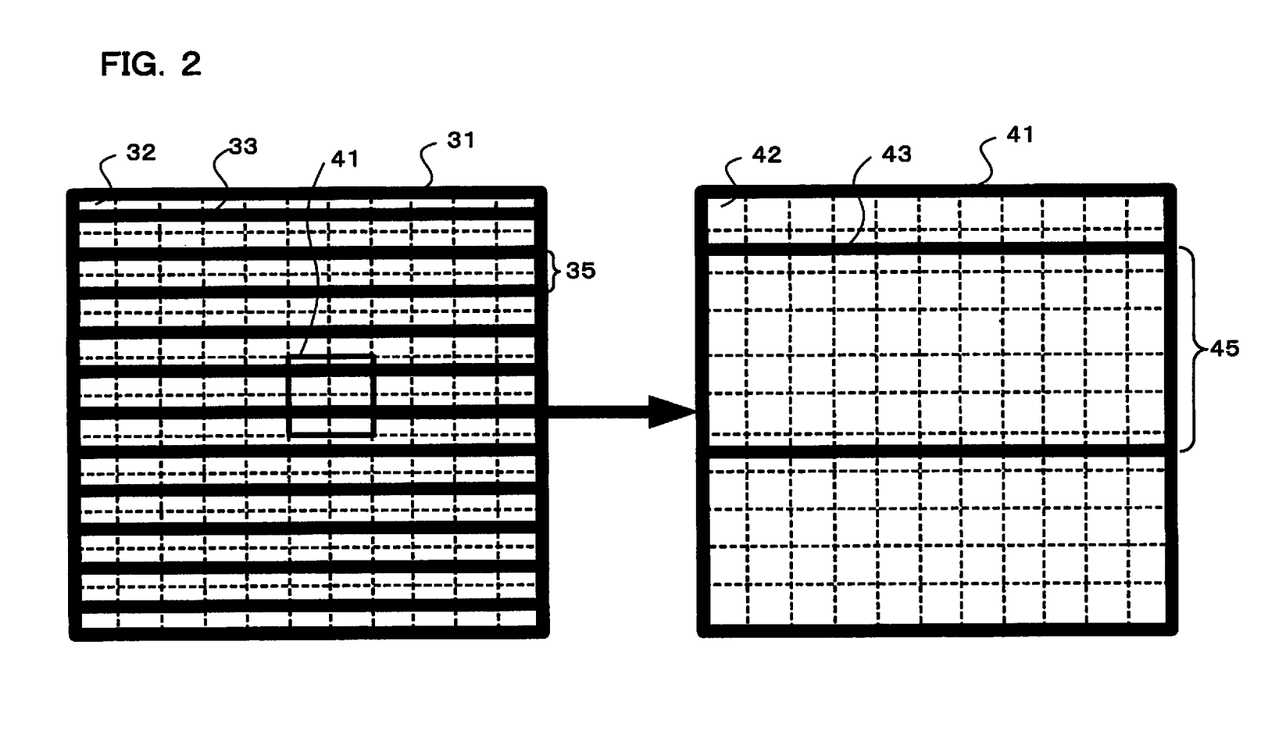
FIG. 2 is a drawing for describing a photometry range for detecting flicker, with a camera of one embodiment of the present invention.

In FIG. 2, the outer border of the left side drawing shows photometry range 31, and areas enclosed by dotted lines represent multiply divided photometry areas 32. Within the photometry range 31, 11×11=121 photometry areas are provided. Also, the gray lines extending in the sideways direction represent flicker streaks 33, and 11 flicker streaks appear at a flicker streak interval 35 within the photometry range 31. Specifically, a state is shown where a single flicker streak correspondingly appears for a single photometry area. In this case, it is not possible to determine that flicker streaks exist.

In FIG. 2, the outer border in the right side drawing represents a photometry range 41, and this photometry range results from having expanded the photometry range 41 within the photometry range 31 in the left side drawing of FIG. 2. Specifically, the photometry range 41 is set as a new photometry range in part of the photometry range 31. Then, the photometry range 41 that has been set is divided similarly to the case of the photometry range 31. Areas enclosed by dotted lines are multiply divided photometry areas 42, and 11×11=121 photometry areas are set within the photometry range 41 also. Also, the gray lines extending in the sideways direction represent flicker streaks, and 2 flicker streaks having a flicker streak interval 45 appear within the photometry range 41.

The flicker streak interval 35 of the photometry range 31 shown in FIG. 2 (interval between one flicker streak and another flicker streak) is 1 when converted to a number corresponding to vertical width of the photometry area, but by reducing the photometry range by (2/number of vertical divisions) (in FIG. 2 this would be 2/11=1/5.5) the flicker streak interval 45 is made 5 by converting to photometry area vertical width. If interval between flicker streaks is two or more, it is possible to detect differences in photometry results for every frame caused by movement of flicker streaks. However, in the event that frame period and flicker period are synchronized, streaks will not move, and it is no longer possible to detect flicker streaks (streaks that move in different frames). In this case, frame rate may be changed and detection is performed again for confirmation.

In a case where it is not possible to detect moving flicker streaks even if part of the photometry range is set as a new photometry range, that is, the photometry range is reduced (photometry range is narrowed), and frame rate is changed, it is determined that flicker frequency is a higher frequency. Then, photometry range is reduced again and similar detection or determination is repeatedly performed until there is reduction to a photometry range constituting a limit of flicker frequency detection. It should be noted that photometry range reduction processing involves narrowing photometry range, and again setting the same number of photometry areas as a number of photometry areas before reduction processing, within the photometry range that has been narrowed. It should be noted that the number of photometry areas that are set again does not always need to be the same as the previous number of photometry areas.

In this way, with this embodiment, detection processing for moving streak flicker is applied in a photometry range that has been set, and if a frequency range in which detection is possible with that photometry range does not correspond to a flicker frequency, reduction processing for the photometry range is performed (the photometry range is narrowed), and processing to increase a frequency range in which detection is possible is repeated. In a case where flicker streak interval at the time when detection was not possible was 1 [area], a rate of reduction of the photometry range at the time detection was not possible is made (2/number of vertical divisions) [times], so that it is possible to make a flicker streak interval (2/number of vertical divisions) [areas]. For example, if a number of divisions of a vertical area is 11, a reduction rate may be made 2/11=1/5.5 times. It should be noted that flicker frequencies of various lighting equipment and lighting systems are generally known, and these types of flicker frequencies may be stored in advance in non-volatile memory. It can then be determined whether or not a frequency range that has been detected corresponds to a flicker frequency that has been stored.

Next, flicker detection of this embodiment will be described using the flowcharts shown in FIG. 3A, FIG. 3B and FIG. 4. These processing flows are executed by the CPU within the control section 11 controlling each section in accordance with programs stored in the memory.

If the flow shown in FIG. 3A is started, first, single area acquisition time is calculated (S1). A single area corresponds to the photometry ranges 31 and 41 etc. in FIG. 2, and photometry range is progressively narrowed for the purpose of Flicker detection. In this step the control section 11 calculates a time for reading out pixel data of a single area, within the photometry range that is currently set, on the image sensor 18.

It should be noted that single area acquisition time Ta can be calculated using equation (1) below.

$$TA=Thd[\text{sec}]*(Ne-1)+Ti \qquad (1)$$

Thd is a time [sec] by which time, of commencing accumulation for a single line within an area in a horizontal direction of the image sensor 18, is displaced for each line. Displacement time for displacing accumulation commencement time for each line is set as a control parameter for rolling shutter control of a CMOS image sensor, for example. Also, Ne is a number of pixels in the vertical direction (number of vertical lines) of a photometry area that has been divided. Ti is accumulation time (integration time).

If the single area acquisition time has been acquired, next a maximum value fmax and minimum value fmin for flicker frequency acquisition range according to flicker streak interval are calculated (S3). A range of frequency corresponding to number of intervals x between flicker streaks within the photometry range can be calculated using equations (2) and (3) below.

$$f\min=(1/Ta)*(x) \qquad (2)$$

$$f\max=(1/Ta)*(x+1) \qquad (3)$$

These values may also be calculated using equations (4) and (5) below.

$$f\min=(1/Ta)*\text{INT}(11/Ls) \qquad (4)$$

$$f\min=(1/Ta)*\text{INT}(11/Ls+1) \qquad (5)$$

Here, x is a number of intervals between flicker streaks (number of flicker streaks−1), Ls is streak interval (distance between one flicker streak and another flicker streak, converted to number of photometry areas in the vertical width direction), fmin is minimum frequency, fmax is maximum frequency, Ta is single area acquisition time [sec], and * means multiply. It should be noted that for equations (4) and (5) a number of divisions for vertical areas is made 11.

If maximum value and minimum value of flicker frequency according to flicker streak interval have been calculated, next streak interval and streak movement amount are detected from photometry results (S5). Here, the control section 11 calculates flicker streak interval and streak movement amount based on pixel data that was acquired within the photometry range that has been set. Streak interval between the streaks that have been detected in this step ([number of areas], expressed by number of areas in the vertical direction of FIG. 2), and movement amount of the streaks between frames ([number of areas]), are detected. Candidates A for flicker frequency are determined from streak interval that has been detected in this step and frequency range that was calculated in step S3 (refer to equations (2) and (3) above).

If streak interval and streak movement amount have been detected in step S5, then next it is determined whether or not (a) it is not possible to detect streaks themselves, (b) there has been no movement of streaks even if frame rate (fps) has been changed by previous processing, or (c) "non-detection" was determined by previous processing (S7). Here, the control section 11 determines based whether or not result of detection in step S5 could be detected as flicker streak. It should be noted that details of the determination as to whether or not the streaks can be detected as flicker streak will be described later using FIG. 4. Also, in step S23, which will be described later, it is determined whether or not there is no movement of position of flicker streaks between frames, despite the frame rate having been changed. Also, in step S21, which will be described later, it is determined whether or not "non-detection" has been determined. It is determined whether any one of these conditions (a) to (c) is satisfied. It should be noted that with this embodiment, determination is performed using the three conditions (a) to (c), but determination may be performed using only one or two conditions, or other conditions may be added.

If the result of determination in step S7 is that all of the conditions are not satisfied, that is that streaks themselves could not be detected, streaks move as a result of changing frame rate (FPS) in previous processing, and "non-detection" was not determined in previous processing, it is determined whether or not detected streaks are moving (S9). Here, the control section 11 determines whether or not position of flicker streaks has moved between frames.

If the result of determination in step S9 is that detected streaks are moving, namely, that it has been determined that streak positions are different between a plurality of frames, a frequency candidate A is calculated from detection results for streak interval (S11). Here, frequency HA [Hz] of a frequency candidate A is calculated using equation (6) below.

$$HA=(f\min+f\max)/2 \qquad (6)$$

It should be noted that fmin means minimum frequency and fmax means maximum frequency.

If a frequency candidate A has been calculated, next streak movement amount is calculated using computation from the frequency candidate A (S13). Here, the control section 11 calculates movement amount MC ([number of areas]) of streaks between frames by computation using movement amount of detected streaks between frames and frequency candidate A that was calculated in step S11, using equation (7) below.

$$MC = \text{remainder of } \{Fr/(1/HA)\} * (1/Ta) \qquad (7)$$

Here, Fr means frame rate period [sec], Ha means frequency HA [Hz] of frequency candidate A, and Ta means single area acquisition time [sec].

If a streak movement amount has been calculated by computation, it is next determined whether or not streak movement amount matches streak movement amount that has been computed (S15). Here, the control section 11 determines whether or not movement amount of streaks between frames that was detected in step S5 and movement amount MC of streaks between frames that was calculated by computation based on equation (7) described above, are equal. If a difference between the two is within a specified value, it is determined that they are equal.

If the result of determination in step S15 is that detected and computed streak movement amounts coincide, the frequency candidate A (frequency HA) is determined to be a flicker frequency, and this processing is completed (S19). Since the movement amount of streaks between frames that has been detected and the movement amount MC of streaks between frames that has been computed are equal, the control section 11 officially determines frequency candidate A as a flicker frequency.

On the other hand, if the result of determination in step S15 is that streak movement amount between frames that has been detected and streak movement amount between frames that has been computed do not coincide, "non-detection" is determined, and processing is performed again from the start (S21). Since actual flicker streaks are different from the frequency of flicker streaks in the case where frequency candidate A has been set, frequency candidate A would be erroneous. Processing then returns to step S1 and detection of flicker frequency is performed again.

Returning to step S9, if the result of this determination is that streaks that have been detected are not moving, the frame rate is changed and processing is performed again from start (S23). In the event that movement amount of streaks between frames is less than a specified value, the control section 11 determines that there is no shift of streaks detected due to synchronization of flicker period with frame rate period. In order to cause movement of flicker streaks, the frame rate is changed, step S1 is returned to, and determination of movement amount of streaks between frames is performed again using computation.

Returning to step S7, in the event that any of the conditions (A) to (c) are satisfied in step S7, it is determined whether or not the size of the photometry range in a case where the photometry range was narrowed (reduced) has reached a specified limit (S17). If the result of determination in step S7 is Yes, it is a case where it not possible to detect flicker streak in the current photometry range. In this case, as was described using FIG. 2, the photometry range is narrowed (reduced). A reduction factor is (2/total number of area divisions) times. With this narrowed photometry range the control section 11 divides into the sane number of photometry area as before change, and performs processing again from the point at which a range of frequency in which it is possible to determine brightness change due to flicker streaks is calculated (step S1).

It should be noted that in the determination of step S17, a specified limit for size of photometry range in the event that a range has been narrowed (reduced) is dependent on a number of pixels of the image sensor 18. If the number of pixels is high, then since sufficient resolution is ensured even if photometry range is reduced, it is possible to perform flicker streak determination. Accordingly, an upper limit of flicker frequency that can be detected is determined by number of pixels of the image sensor.

If the result of determination in step S17 is that an upper limit has not been reached, processing is performed again from the start (step S1), after the photometry range is narrowed (reduced) (S25). On the other hand, if the upper limit is reached, it is determined that there is no flicker, and processing is completed (S27).

In this way, in the flow of this embodiment, flicker streaks are detected using pixel data of each area within a photometry range, and further, it is detected whether or not flicker streaks are moving between frames (refer to S5, S7 and S9). As a result, in a case where flicker streaks are detected and further, flicker streaks are moving, a frequency candidate A is calculated (S11), flicker streak movement between frames is computed from this frequency candidate A (S13), whether this computation result and actual streak movement between frames coincide is compared (S15), and in the event that they coincide the frequency candidate A is determined to be a flicker frequency (S19).

Also, in a case such as where it is not possible to detect flicker streak themselves (S7 Yes), a photometry range is narrowed, and flicker detection is performed again (S17, S25). It should be noted that although, in order to cause movement of flicker streaks, the frame rate is changed in step S23, and determination of movement amount of streaks between frames is performed again using computation, the modified example below may also be implemented. In step S23, the electronic shutter speed is changed without changing the frame rate. Then in step S5, instead of detecting streak movement amount, change amount in strength (brightness) of flicker streaks that do not move between frames of different electronic shutter speed is detected. If change amount in strength (brightness) of flicker streaks is larger than a specified value, it is determined that there are streaks due to flicker.

Next, whether it is possible to detect flicker streaks themselves, namely flicker determination, in step S7 will be described using the flowchart shown in FIG. 4. It should be noted that this flicker determination is processed at specified time intervals. As an overview of this processing, brightness values of three consecutive frames are acquired using output of the image sensor 18 that is repeated at a specified period. In this case, acquiring brightness values for a first frame and a second frame is performed at the same shutter speed. The third frame increases shutter speed by one step faster than was controlled in the first and second frames, and control is performed to change shutter speed while maintaining exposure level with sensitivity raised one step. Flicker determination is performed using brightness value of this third frame.

If the flow for flicker determination is entered, first, live view exposure control is performed (S51). Here, the exposure setting value calculation section 12 calculates aperture value, shutter speed and sensitivity based on the brightness value so as to achieve correct exposure level, the imaging control section 17 and the aperture operation control section 23 perform an imaging operation with each of the calculated values respectively set for lens aperture, and electronic shutter and sensitivity of the image sensor, and imaging output is acquired. A brightness value of the first frame is then acquired (S53). Here, the control section 11 calculates brightness of each area based on imaging output. It should be noted that the brightness value has the same meaning as a photometric value. Also, each area corresponds to the previously described photometry areas and divided photometry areas.

Once brightness value for the first frame has been acquired, next, similarly to step S51, live view exposure control is performed (S55), that is, exposure is executed with aperture value, shutter speed (electronic shutter speed) and sensitivity respectively set to the same values as for the first frame, and brightness value for a second frame is acquired from imaging output (S57). Here, brightness of each area is calculated based on imaging output of the second frame.

Once brightness value of the second frame has been acquired, next, control values are changed, specifically, shutter speed is increased by one step and sensitivity value (ISO sensitivity) is increase by one step (S59). Here, among the aperture value, shutter speed and sensitivity that were controlled in step S53, the imaging control section 17 and the aperture operation control section 23 make the shutter speed faster by one step. Sensitivity is increased by one step so that under exposure does not occur as a result of making the shutter speed one step faster. Then, an imaging operation is performed for the third frame, and imaging output is acquired. Brightness value of each area is then acquired based on imaging output of the third frame (S61).

If brightness values for the third frame has been acquired, next calculation of variation amount for the first and second frames is performed (S63). Here, for brightness values of each region that have been acquired with the first frame and the second frame, a difference in brightness value is calculated for every corresponding area.

Next, variation amount for the second and third frames is calculated (S65). Here, for brightness values of each area that have been acquired with the second frame and the third frame, the control section 11 calculates a difference in brightness value for every corresponding area as a variation amount. In steps S63 and S65, it is possible to acquire brightness change for two frames having the same image sensor integration time (shutter speed), and brightness change for two frames having different integration times (shutter speed), for each area, as respective variation amounts.

If variation amounts have been calculated, it is next determined whether or not change in variation amount between the second and third frames is large (S67). The control section 11 compares whether a difference "amplitude of variation amount of third frame−second frame" between maximum value and minimum value among variation amounts for each area of the second and third frames that were acquired in step S65 is sufficiently larger than a difference "amplitude of variation amount of second frame−first frame" between maximum value and minimum value among variation amounts for each area of the first and second frames that were acquired in step S63. If the result of this comparison is that it has been determined to be sufficiently large, the control section 11 determines that change in variation amount between the second frame and the third frame is large, which leads to further determination that one of conditions for flicker determination is satisfied.

If the result of determination in step S67 is that change in variation amount for the second and third frames is large, it is next determined whether or not it satisfies a periodicity evaluation (S69). Here, the control section 11 bases determination on whether or not appearance of streaks corresponds to periodicity of flicker, that is, whether or not number of streaks, streak interval, and streak movement amount correspond to characteristics of flicker.

If the result of determination in step S69 is correspondence to periodicity evaluation, the control section 11 determines flicker (S75). On the other hand, if a determination result in step S67 or step S69 is No, the control section 11 determines that there is not flicker. Once flicker determination has been performed, the originating flow is returned to.

It should be noted that in the case of S67 No or step S69 No, the following processing may be performed. The control section 11 determines whether or not change in variation amount between the first and second frames is large. Then, if change in variation amount for the first and second frames is larger than a specified value, it is determined whether or not there is correspondence to periodicity evaluation, similarly to as described previously. Then, if there is correspondence to periodicity evaluation, it is determined that there is flicker. This is because in the case where flicker period is not synchronized to frame frequency, change in variation amount of the first and second frames is large, and so this flicker situation is determined to be that there is flicker. Also, if change in variation amount for the first and second frames is less than or equal to a specified value, or if there is not correspondence to a periodicity evaluation, it is determined that there is no flicker.

Also, making integration time for each frame different is only performed when strength of flicker streaks that do not move is checked. Specifically, comparison is performed with a common integration time. Also, with respect to detection of flicker streaks, when determining whether or not number of streaks and streak interval are established as conditions for flicker, it is possible to prevent erroneous detection based on movement of patterns due to hand shake, by monitoring over a plurality of frames.

Next, a relationship between photometry range and display range will be described. With this embodiment, there is a change in photometry range in order to perform flicker detection. While it is conceivable to change display range to align with this change in photometry range, from the viewpoint of the user, magnification factor of a display screen is changed arbitrarily and appearance is bad. Therefore, in a case where high-frequency flicker detection mode has been set by menu operation, exposure for display is fixed (AEL), and the camera continues full-screen display. Since a photometry range for automatic exposure control (a) is not dependent on display size, area division is performed with a fixed number of divisions while partially changing (reducing) photometry range for flicker detection, and detection processing of (B) described above is performed.

If the flicker detection processing is completed, the results are displayed to the user, and results of flicker detection are provided to the exposure setting value calculation section 12 and reflected in exposure control. It should be noted that with this embodiment, it is assumed that result of flicker detection is utilized in exposure setting so as to cancel flicker by synchronizing shutter speed Tv with flicker period. In this way, at the time of flicker detection processing, display range is fixed without showing a user a magnified display, such as display corresponding to reduction in photometry range.

Next, details of the relationship between photometry range and display range will be described using FIG. 5. A display image 51 is a live view image that is displayed on the camera information display section 15 at the time flicker has been detected. Frames surrounded by dashed lines within the display image 51 and arranged at lattice positions are a plurality of photometry areas 61 that have been divided. Also, an outer border of the plurality of photometry areas 61 is a photometry range 62. It should be noted that Ob is a main subject. If the dashed lines showing the photometry areas do not need to be recognized by the user, they do not need to be displayed on the camera information display section 15. If the dashed lines are not displayed, there is the effect of preventing the screen becoming difficult to see due to the photometry areas being displayed superimposed on the main subject image. Also, only the outer border (solid line) of the photometry areas may be displayed.

The display image 51 is an image at the time of commencing detection of high frequency flicker, as was described previously, and in this state the camera information display section 15 is fixed at an exposure immediately before commencement of high-frequency flicker detection (AEL), and full screen display is being performed. Also, the exposure setting value calculation section 12 executes moving streak flicker detection processing.

A display image 52 is a display image of when performing flicker detection again in a case where it was not possible to detect flicker at the time of display of the display image 51 (FIG. 3A: S7 (Yes)→S17 (NO)→S25). Frames surrounded by dashed lines within the display image and arranged at lattice positions are a plurality of photometry range areas 63 that have been divided. Also, an outer border of the plurality of photometry areas 63 is a photometry range 64. The photometry 63 range 64 is a range in which flicker is calculated, as described previously, and although size of the photometry range 64 is narrower than the photometry range 62, since the number of divisions of photometry areas within each photometry range is the same, the size of the photometry areas 63 becomes narrower than the photometry areas 61. A position of the main subject Ob (for example, center of the main subject Ob) is made a central position for reducing photometry range. As a main subject, any position, such as AF position, face detection position, position of exposure area that has been set manually, etc. is determined.

In a state where the display image 52 is being displayed, the camera information display section 15 locks at an exposure immediately before commencement of high frequency flicker detection (AEL), and full screen display is performed. Also, the exposure setting value calculation section 12 reduces the photometry range, as described previously, and performs division of the photometry areas that have been reduced, and executes moving streak flicker detection processing based on detection results in the divided photometry areas.

A display image 53 is a display image of when performing flicker detection again in a case where it was not possible to detect flicker at the time of display of the display image 52. Frames surrounded by dashed lines within the display image 53 and arranged at lattice positions are a plurality of photometry range areas 65 that have been divided. Also, an outer border of the plurality of photometry areas 65 is a photometry range 66. Although size of the photometry range 66 is narrower than the photometry range 64, since the number of divisions of photometry areas within each photometry range is the same, the size of the photometry areas 65 becomes narrower than the photometry areas 63.

In a state where a display image 53 is being displayed, the camera information display section 15 locks at an exposure immediately before commencement of high frequency flicker detection (AEL), and full screen display is performed. Also, the exposure setting value calculation section 12 further reduces the photometry range and performs division of the photometry areas, and executes moving streak flicker detection processing.

The display image 54 is a display image in a case where it was not possible to detect flicker at the time of display of the display image 53, and further limit of reduction of the photometry range has been reached (S17 Yes in FIG. 3B), that is, at the time of completion of detection of high frequency flicker. Frames surrounded by dashed lines within the display image 54 and arranged at lattice positions are a plurality of photometry range areas 67 that have been divided. Also, an outer border of the plurality of photometry areas 67 is a photometry range 68. The photometry range 68 returns to the normal state at the time of display image 51, since the limit of restriction of the photometry range has been reached.

In a state where the display image 54 is being displayed, the camera information display section 15 releases the fixed exposure immediately before commencement of high frequency flicker detection (AEL), and a normal display state is returned to. Also, the exposure setting value calculation section 12 passes a determination result of "non-detection" to an exposure control block within the exposure setting value calculation section 12, and the photometry range returns to a normal state. The fact that flicker is "not detected" may also be displayed to the user.

A display image 55 is a display image for a case where it was not possible to detect flicker in the state of the display image 51, display image 52 or display image 53. Frames surrounded by dashed lines within the display image 55 and arranged at lattice positions are a plurality of photometry range areas 69 that have been divided. Also, an outer border of the plurality of photometry areas 69 is a photometry range 70. Since the photometry range 70 was able to detect flicker, a normal state of display image 51 is returned to.

In a state where the display image 55 is being displayed, the fixed exposure immediately before commencement of high frequency flicker detection (AEL) is released, and a normal display state is returned to. The exposure setting value calculation section 12 returns the photometry areas to a normal state (refer to the photometry area 69), passes a frequency detection result that has been detected to an exposure control block within the exposure setting value calculation section 12, synchronizes shutter speed Tv to a flicker period, and performs exposure setting so as to remove flicker. The fact that flicker has been detected may also be displayed to the user.

Next a case where the user synchronizes the shutter speed Tv to the flicker period with a manual operation, and processing to remove flicker is performed, will be described. In this case, streaks are removed by the user manually changing shutter speed Tv while confirming flicker streaks displayed on a rear surface panel etc. It is then possible to perform setting so that flicker does not occur in an image resulting from still picture shooting by making shutter speed Tv for exposure control when an image is displayed on a rear surface panel etc., and shutter speed Tv for exposure control at the time of still picture shooting, the same value.

In a case where flicker streaks that occur when shooting a still picture with an electronic shutter (shooting at this time is called "electronic shutter still shooting") while the user is performing confirmation, since the appearance of flicker streaks is the same as at the time of still picture shooting it is necessary to make imaging drive mode at the time of live view display (number of pixels, curtain speed etc.) the same for a live view image and electronic shutter still shooting. However since imaging drive mode generally used for still pictures has a large number of pixels, power consumption of the image sensor peripheral circuitry becomes high. For this reason, when performing live view display it is common to use a low power consumption drive mode that is different to the drive mode for electronic shutter still shooting.

With this embodiment, from a power consumption viewpoint also, as a mode that is specific to flicker detection and removal, separately to normal live view display, it is possible for the user to select and set a separate display mode "LED flicker handling mode". In a case where LED flicker handling mode has been set, it is preferable for live view to be displayed by setting imaging drive mode for live view display (control mode of the image sensor 18 and imaging control section 17) to the same drive mode as for imaging for electronic shutter still shooting. In this way, flicker state arising when performing live view display becomes equal to that of an image formed for electronic shutter still shooting. It is possible for the user to confirm flicker removal for an image that has been formed with electronic shutter still shooting while observing live view display, by finally adjusting shutter speed Tv.

As an auxiliary function of the LED flicker handling mode, an "LED flicker detection function" that executes processing (A) and (B) required for the above described flicker determination is executed by user operation. If the user commences execution of the "LED flicker detection function", processing (A) and (B) is executed and flicker detection processing is performed. During this processing exposure is locked, and a state where the user awaits processing completion is entered.

Once flicker detection processing is complete, it is possible for the user to remove flicker manually by performing (i) to (iv) shown below.

(i) Information as to the existence or nonexistence of flicker is displayed on a screen (guidance display) in accordance with flicker detection result.

(ii) If it is displayed that there is flicker, information for a range of shutter speed Tv candidates that can remove flicker is displayed on the screen (guidance display).

(iii) An operation section that can set shutter speed Tv in a one such manner is provided on the range of shutter speed Tv candidates that have been displayed in (ii) described above. As the operation section there are, for example, button assignment and touch panel operation etc. In a case where flicker is removed by the user finely adjusting shutter speed Tv manually, since resolution for shutter speed becomes high it takes too much time for the user to find the target shutter speed Tv with the diversity of alternatives for shutter speed TV. It is therefore desirable to provide a way to set shutter speed TV with a one touch operation.

(iv) After having selected a shutter speed Tv with a one touch operation in (iii) above, in the event that there is not a shutter speed Tv that synchronizes perfectly with the flicker frequency the user manually corrects minute shifts.

In this way, with one embodiment of the present invention, if streaks are detected from photometry results for photometry areas that have been multiply divided, the photometry areas are divided while changing photometry range, and it is possible to detect flicker in a wide range of frequency, up to high frequency flicker. With one embodiment of the present invention the following processes (1) to (3) are performed.

(1) For a current photometry range, it is possible to calculate a range of frequency corresponding to photometry area interval of flicker streaks from read out time of photometry areas that have been multiply divided (refer, for example, to equations (2) and (3), and to S3 in FIG. 3A).

(2) Detection of moving streaks is executed from photometry information for each photometry area, and flicker streak interval and movement amount are detected. Then, a streak interval that has been detected is compared with a frequency range that was calculated in (1) above, and it is confirmed whether the compared frequency matches conditions for movement amount of streaks between frames that have been detected (refer, for example, to S7 in FIG. 3A). If conditions are matched, that frequency is determined to be a flicker frequency. Also, if flicker streaks are not moving streaks, the frame rate is changed and the same processing is executed again (refer to S23 in FIG. 3B). It should be noted that in a case where a flicker frequency is detected without switching frame rate, a value of shutter speed Tv is switched between frames, it is checked whether brightness of flicker streaks that do not move has changed, and it is determined whether streaks are due to flicker.

(3) If a flicker frequency predetermined in (2) described above, it is determined that there is a flicker frequency that is faster than current conditions, the photometry range is narrowed, division is performed to the same number of areas in that range, and the processing of (1) described above is returned to (refer, for example, to S17 No and S25 in FIG. 3B). The above described processes (1) to (3) are repeated, and detection is performed until flicker of a high-frequency.

Also, with one embodiment of the present invention, the above described processes (1) and (2) are executed with shooting standby in progress for the camera. If high-frequency flicker detection mode has been set by menu operation, exposure for display is locked (AEL), and the camera continues full-screen display. Without displaying photometry range for AE, as electrical processes of the camera the camera performs fixed area division while changing (reducing) photometry range, and performs flicker detection. Flicker detection is executed without showing a magnified display of photometry range to the user.

Figure 5:
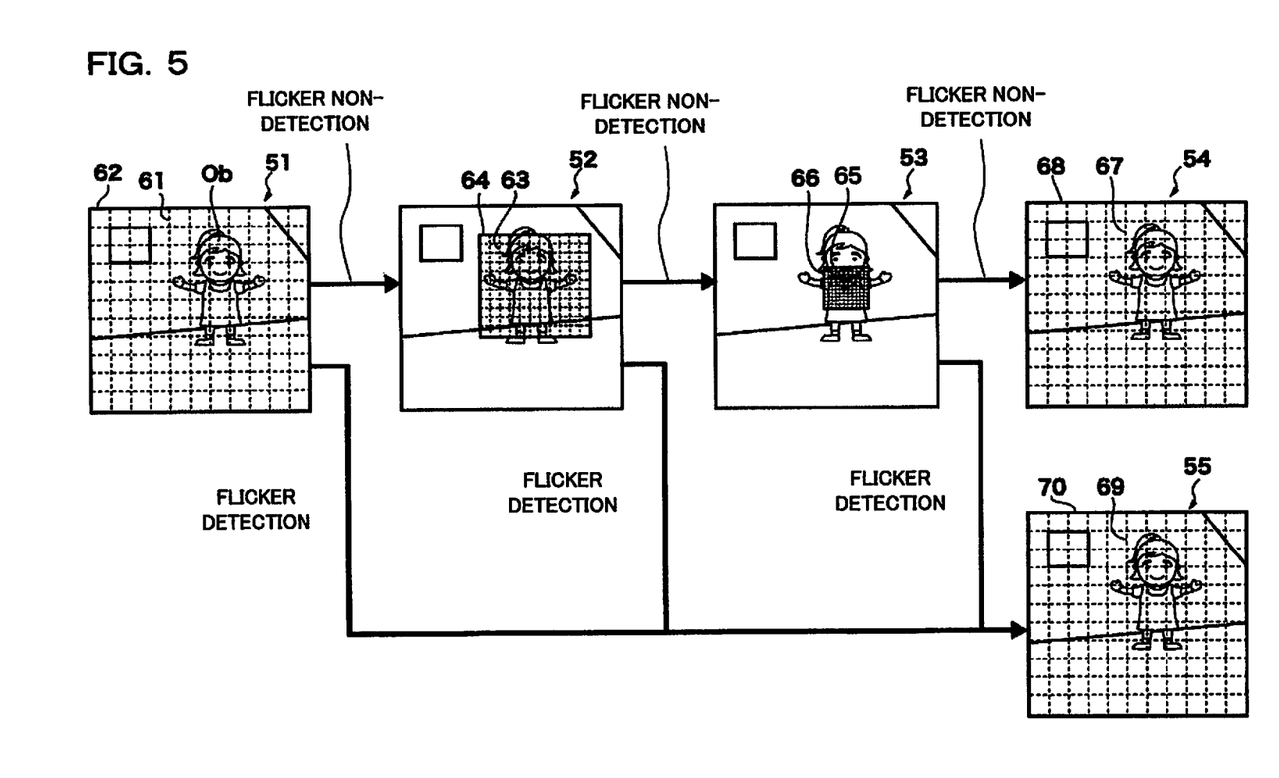
FIG. 5 is a drawing showing one example of detection of flicker, with a camera of one embodiment of the present invention.

In this way, with one embodiment of the present invention, an imaging range of the image sensor is divided into a plurality of regions, photometry is performed for the divided regions based on a pixel signal output by the image sensor, and divided regions in which it is expected that flicker streaks will exist are detected (refer, for example, to FIG. 2, S5 in FIG. 3A, and FIG. 5). It is then determined whether or not it was possible to detect flicker streaks (refer, for example, to S7 in FIG. 3A), and if it was not possible to detect flicker streaks area of the divided regions is reduced and detection of divided regions in which it is expected that flicker streaks will exist is performed (refer, for example, to S17 and S25 in FIG. 3B). This means that it is possible for a user to easily perform flicker cancellation. Specifically, if it was not possible to detect flicker streaks, it becomes easier to detect flicker streaks as a result of reducing a range of flicker detection.

Figure 4:
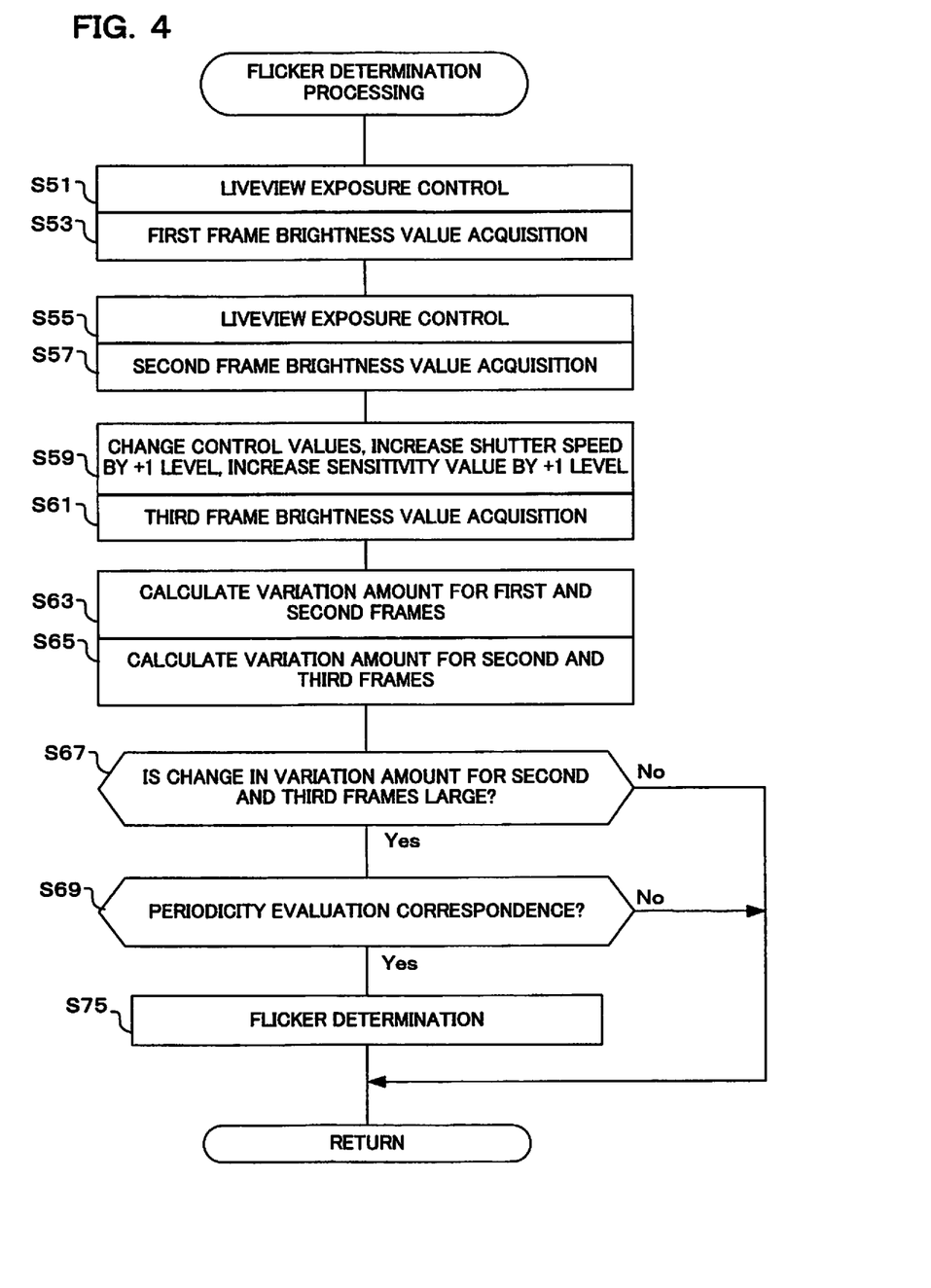
FIG. 4 is a flowchart showing operation for detecting flicker streak interval and streak movement, of a camera of one embodiment of the present invention.

It should be noted that with one embodiment of the present invention, flicker determination processing is mainly realized in software by a CPU performing processing in accordance with programs (refer to FIG. 3A, FIG. 3B and FIG. 4). However, implementation is not limited to software, and some or all sections may be realized by hardware.

Also, with the one embodiment of the present invention the exposure setting value calculation section 12, aperture value transmission and reception section 13, shutter speed and sensitivity operation control section 14, camera information display section 15, and photometry control section 16 are configured inside the control section 11, with sections being executed in software using the CPU, and sections being configured using hardware. However, this is not limiting, and those sections may be configured separately to the control section 11. It is also possible to have a hardware structure such as gate circuits that have been generated based on a programming language that is described using Verilog, and also to use a hardware structure that utilizes software such as a DSP (digital signal processor). Suitable combinations of these approaches may also be used. Also, some functions of the CPU may be implemented by circuits that are executed by program code such as a DSP, may use a hardware structure such as gate circuits that are generated based on a programming language described using Verilog, or may be executed using hardware circuits.

Also, with the one embodiment of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone a mobile information terminal, personal computer (PC), tablet type computer, game console etc., or a camera for a scientific instrument such as a microscope, a camera for mounting on a vehicle, a surveillance camera etc. In any event, it is possible to adopt the present invention as long as a device is for shooting where there is a possibility of flicker occurring.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
an image sensor that for a subject image by means of an optical system; and
a processor that comprises a flicker streak detection section and a determination section, wherein
the flicker streak detection section divides an imaging range of the image sensor into a plurality of regions, performs photometry of the regions that have been divided based on a pixel signal output by the image sensor, and detects divided regions in which it is expected that flicker streaks will exist, and
the determination section determines whether or not it was possible to detect flicker streaks using the flicker streak detection section,
wherein
the flicker streak detection section, in a case where it has been determined by the determination section that it was not possible to detect flicker streaks, reduces area of the divided regions and detects divided regions in which it is expected that flicker streaks will exist.

2. The imaging device of claim 1, the processor further comprising:
a flicker frequency calculation section that calculates interval, on the image sensor, between a first divided region and a second divided region in which it is expected that the flicker streaks will exist, and calculates a frequency of flicker corresponding to the flicker streaks based on a difference between accumulation times corresponding to the first divided region and the second divided region.

3. The imaging device of claim 1, wherein:
the determination section detects flicker streaks using the flicker streak detection section, and determines whether or not it was possible to detect flicker streaks based on interval, on the image sensor, between divided regions in which flicker streaks exist.

4. The imaging device of claim 3, wherein:
the determination section determines whether or not it was possible to detect flicker streaks based on a difference of intervals, on the image sensor, between divided regions in which flicker streaks exist, and frequency of the flicker.

5. The imaging device of claim 1, wherein:
the flicker streak detection section executes imaging operations of the image sensor at a first frame rate, and detects divided regions in which it is expected that flicker streaks will exist based on pixel signals that have been acquired using different imaging operations, and
the determination section determines whether or not there is change in position of the divided regions in which it is expected that flicker streak will exist, and if it is determined that there is no change the flicker streak detection section executes imaging operations of the image sensor at a second frame rate, and detects divided regions in which it is expected that flicker streaks will exist based on pixel signals that have been acquired using different imaging operations.

6. The imaging device of claim 1, wherein:
the flicker streak detection section executes imaging operations of the image sensor at a first frame rate and at a first electronic shutter speed, and detects divided regions in which it is expected that flicker streaks will exist based on pixel signals that have been acquired using different imaging operations, and
the determination section determines whether or not there is change in position of the divided regions in which it is expected that flicker streak will exist, and if it is determined that there is no change the flicker streak detection section executes imaging operations of the image sensor at a second frame rate and at a second electronic shutter speed, and detects divided regions in which it is expected that flicker streaks will exist based on pixel signals that have been acquired using different imaging operations.

7. The imaging device of claim 1, wherein:
the imaging device has a display that performs display based on imaging output of the image sensor,
the processor controls operation of the display, and
imaging operations of the image sensor are performed in time division, to acquire an image signal used by the flicker streak detection section, and an image signal used in display by the display.

8. A flicker detection method, for an imaging device having an image sensor that forms a subject image by mean of an optical system, comprising:
dividing an imaging range of the image sensor into a plurality of regions, performing photometry of the regions that have been divided based on an pixel signal output by the image sensor, and detecting divided regions in which it is expected that flicker streaks exist,
determining whether or not it was possible to detect the flicker streaks,
and if it was not possible to detect the flicker streaks, reducing area of the divided regions and detecting divided regions in which it is expected that flicker streaks will appear.

9. The flicker detection method of claim 8, further comprising:
calculating interval, on the image sensor, between a first divided region and a second divided region in which it is expected that the flicker streaks will exist, and calculating a frequency of flicker corresponding to the flicker streaks based on a difference between accumulation times corresponding to the first divided region and the second divided region.

10. The flicker detection method of claim 8, further comprising:
detecting flicker streaks, and determining whether or not it was possible to detect flicker streaks based on interval, on the image sensor, between divided regions in which flicker streaks will exist.

11. The flicker detection method of claim 10, further comprising:
determining whether or not it was possible to detect flicker streaks based on a difference of intervals, on the image sensor, between divided regions in which flicker streaks exist, and frequency of the flicker.

12. The flicker detection method of claim 8, further comprising:
executing imaging operations of the image sensor at a first frame rate, and detecting divided regions in which it is expected that flicker streaks will exist based on pixel signals resulting from different imaging operations, and
determining whether or not there is change in position of the divided regions in which it is expected that flicker streak will exist, and if it is determined that there is no change, executing imaging operations of the image sensor at a second frame rate, and detecting divided regions in which it is expected that flicker streaks will exist based on pixel signals resulting from different imaging operations.

13. The flicker detection method of claim 8, further comprising:
executing imaging operations of the image sensor at a first frame rate and at a first electronic shutter speed, and detecting divided regions in which it is expected that flicker streaks will exist based on pixel signals resulting from different imaging operations, and determining whether or not there is change in position of the divided regions in which it is expected that flicker streak will exist, and if it is determined that there is no change, executing imaging operations of the image sensor at a second electronic shutter speed, and detecting divided regions in which it is expected that flicker streaks will exist based on pixel signals resulting from different imaging operations.

14. The flicker detection method of claim 8, wherein:
the imaging device has a display that performs display based on imaging output of the image sensor, the flicker detection method further comprising
controlling operations of the display, and
performing imaging operations of the image sensor in time division using the image sensor, to acquire an image signal used by the flicker streak detection section, and an image signal used in display by the display.

15. A non-transitory computer-readable medium storing a processor executable code, which when executed by at least one processor, performs a flicker detecting method, the processor being arranged within an imaging device having an image sensor that forms a subject image by means of an optical system, the flicker detecting method comprising:
dividing an imaging range of the image sensor into a plurality of regions, performing photometry of the regions that have been divided based on an pixel signal output by the image sensor, and detecting divided regions in which it is expected that flicker streaks exist,
determining whether or not it was possible to detect the flicker streaks,
and if it was not possible to detect the flicker streaks, reducing area of the divided regions and detecting divided regions in which it is expected that flicker streaks will appear.

16. The non-transitory computer-readable medium of claim 15, storing further processor executable code, which when executed by the at least one processor, cause the at least one processor to perform a method further comprising:
calculating interval, on the image sensor, between a first divided region and a second divided region in which it is expected that the flicker streaks will exist, and calculating a frequency of flicker corresponding to the flicker streaks based on a difference between accumulation times corresponding to the first divided region and the second divided region.

17. The non-transitory computer-readable medium of claim 15, storing further processor executable code, which when executed by the at least one processor, cause the at least one processor to perform a method further comprising:
determining whether or not it was possible to detect flicker streaks based on a difference of intervals, on the image sensor, between divided regions in which flicker streaks exist, and frequency of the flicker.

18. The non-transitory computer-readable medium of claim 15, storing further processor executable code, which when executed by the at least one processor, cause the at least one processor to perform a method further comprising:
executing imaging operations of the image sensor at a first frame rate, and detecting divided regions in which it is expected that flicker streaks will exist based on pixel signals resulting from different imaging operations, and
determining whether or not there is change in position of the divided regions in which it is expected that flicker streak will exist, and if it is determined that there is no change, executing imaging operations of the image sensor at a second frame rate, and detecting divided regions in which it is expected that flicker streaks will exist based on pixel signals resulting from different imaging operations.

19. The non-transitory computer-readable medium of claim 15, storing further processor executable code, which when executed by the at least one processor, cause the at least one processor to perform a method further comprising:

executing imaging operations of the image sensor at a first frame rate and at a first electronic shutter speed, and detecting divided regions in which it is expected that flicker streaks will exist based on pixel signals resulting from different imaging operations, and determining whether or not there is change in position of the divided regions in which it is expected that flicker streak will exist, and if it is determined that there is no change, executing imaging operations of the image sensor at a second electronic shutter speed, and detecting divided regions in which it is expected that flicker streaks will exist based on pixel signals resulting from different imaging operations.

* * * * *